United States Patent [19]
Jones

[11] 3,844,941
[45] Oct. 29, 1974

[54] USE OF SULFUR FOR COMBATTING OIL SPILLS

[75] Inventor: Loyd W. Jones, Tulsa, Okla.

[73] Assignee: Amoco Production Company, Tulsa, Okla.

[22] Filed: Feb. 1, 1971

[21] Appl. No.: 111,418

[52] U.S. Cl............... 210/40, 210/67, 210/DIG. 21
[51] Int. Cl............................................. C02b 9/02
[58] Field of Search............ 210/40, 41, 42, 49, 55, 210/DIG. 21, 67, 71, 23, 30, 36, 39, 43, 170, 242, 502, DIG. 5; 252/328–330, 439

[56] References Cited
UNITED STATES PATENTS

| | | | |
|---|---|---|---|
| 1,812,629 | 6/1931 | Gifford | 252/330 |
| 2,385,527 | 9/1945 | Menefee et al. | 210/28 X |
| 3,518,183 | 6/1970 | Evans | 210/40 |
| 3,567,660 | 3/1971 | Winkler | 210/40 X |
| 3,591,494 | 7/1971 | Crouch et al. | 210/40 |
| 3,732,162 | 5/1973 | McCoy et al. | 210/40 |

FOREIGN PATENTS OR APPLICATIONS

| | | | |
|---|---|---|---|
| 3,036 | 2/1900 | Great Britain | 210/40 |

Primary Examiner—Thomas G. Wyse
Attorney, Agent, or Firm—John D. Gassett; Paul F. Hawley

[57] ABSTRACT

This invention relates to water pollution control and concerns a system for combatting the problems which occur when oil is spilled upon a body of water. It concerns a method in which sulfur is spread over the spilled oil to hold the oil mass together to permit it to be easily removed from the body of water. In a preferred embodiment, molten sulfur is sprayed as very fine strands over and around the periphery of an oil spill to enmesh the oil in a sulfur web and keep it confined. In another embodiment, sulfur powder is spread over the oil and tends to hold it together. In those cases where sinking of the oil is the most practical solution to the oil spill problem, greater amounts of powdered yellow sulfur, e.g., at least about three parts by weight of sulfur to one part crude oil, is applied. The oil captured by the sulfur is easily recovered with the sulfur and separation of the oil and sulfur is easily obtained by heating and gravity separation.

29 Claims, 11 Drawing Figures

INVENTOR.
LOYD W. JONES
BY John D. Gassett
ATTORNEY

1

USE OF SULFUR FOR COMBATTING OIL SPILLS

BACKGROUND OF THE INVENTION

1. Field of the Invention

This invention relates to a method of removing oil from the surface of a body of water by contacting the oil with yellow sulfur to cause the oil to be held and prevented from spreading. It particularly concerns a method whereby the sulfur is applied to the oil by spraying molten sulfur as very fine strands of plastic sulfur over and about the periphery of the oil. It also concerns a system in which the sulfur and adherred oil are recovered from the water and the oil subsequently separated from the sulfur.

2. Setting of the Invention

In recent years more and more petroleum oil is produced from wells drilled in bodies of water such as the Gulf of Mexico. Each year also finds more and more oil shipped from one location to another by huge ocean-going tankers. Many safeguards and government regulations are provided in an effort to eliminate any loss of oil or spills of oil on the bodies of water. However, despite all the precautions taken, there is still a significant number of accidents which result in large volumes of oil being spilled upon the seas and harbor areas. These oil spills are very undesirable, as it is well known that they can cause damage to the wildlife and pollute beaches to the point where they cannot be used for recreational activities.

Considerable effort has been expended to try to find effective ways to combat these oil spills. For example, many mechanical oil skimmers and containment devices have been developed; various chemicals have been tried to coagulate the oil to aid in its recovery and still other methods have been devised to attempt to sink the oil to the bottom of the body of water by spraying finely divided clays or silicone treated sand on the surface of the oil. These methods have merit, but are not nearly as effective as would be desired. Thus, it is seen that there is a need for new methods of removing the oil from the surface of bodies of water when oil spills occur. This present invention provides such a new improved system.

BRIEF SUMMARY OF THE INVENTION

This invention concerns a method for removing oil from a body of water by contacting the oil with sulfur so that the oil adheres to the sulfur and thus loses its tendency to spread and is more easily recovered. In a preferred embodiment, molten sulfur is sprayed as very fine strands over an oil spill on water to enmesh the oil in a web and keep it confined. The oil adheres to the resulting plastic sulfur web. Recovery of the plastic sulfur web also recovers the oil. The sulfur web and oil are then separated by any desired process such as by heating and gravity separation. The recovered sulfur can be reused and the recovered oil can be used for fuel or other purposes.

In another embodiment, finely divided yellow sulfur is sprinkled on the oil. This sulfur causes the oil to be held together and aids in preventing spreading of the oil. If it is desired to sink the oil to the bottom of the body of water, large amounts of powdered sulfur, e.g., at least about three parts by weight of sulfur to about one part crude oil, is applied. If the water is not too deep the sunken mass of crude oil and sulfur can be pumped off bottom and the crude oil recovered. An important feature of this invention is that sulfur is not toxic to plant or animal life and in fact will promote microbial decomposition of any oil that is not subsequently recovered. Unlike other fibrous material such as straw, the plastic sulfur strands of my system can be formed to any desired length to produce a continuous coherent light weight mass of intertwined fibers.

BRIEF DESCRIPTION OF THE DRAWINGS

A better understanding of the invention and various modifications and objects thereof can be made with the following description taken in conjunction with the drawings.

DETAILED DESCRIPTION OF THE INVENTION

Figure 1:
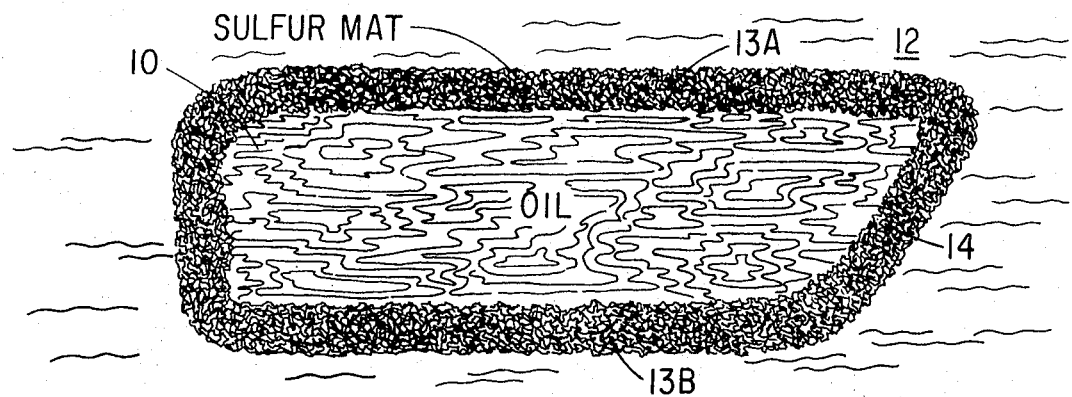
FIG. 1 illustrates oil on a body of water confined by a sulfur mat about the periphery of the oil.
Figure 2:
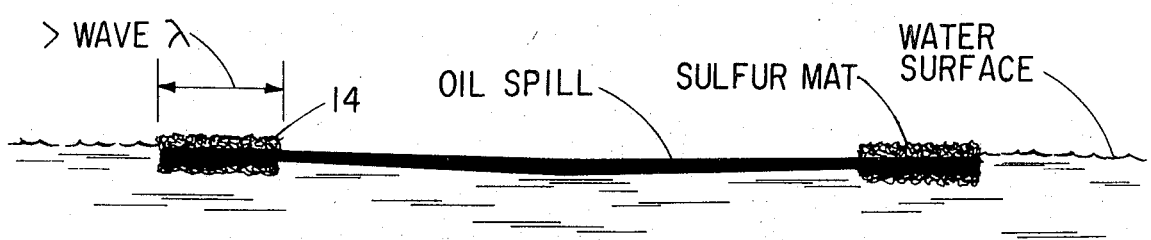
FIG. 2 illustrates a vertical section showing an oil spill and a sulfur mat barrier.
Figure 3:
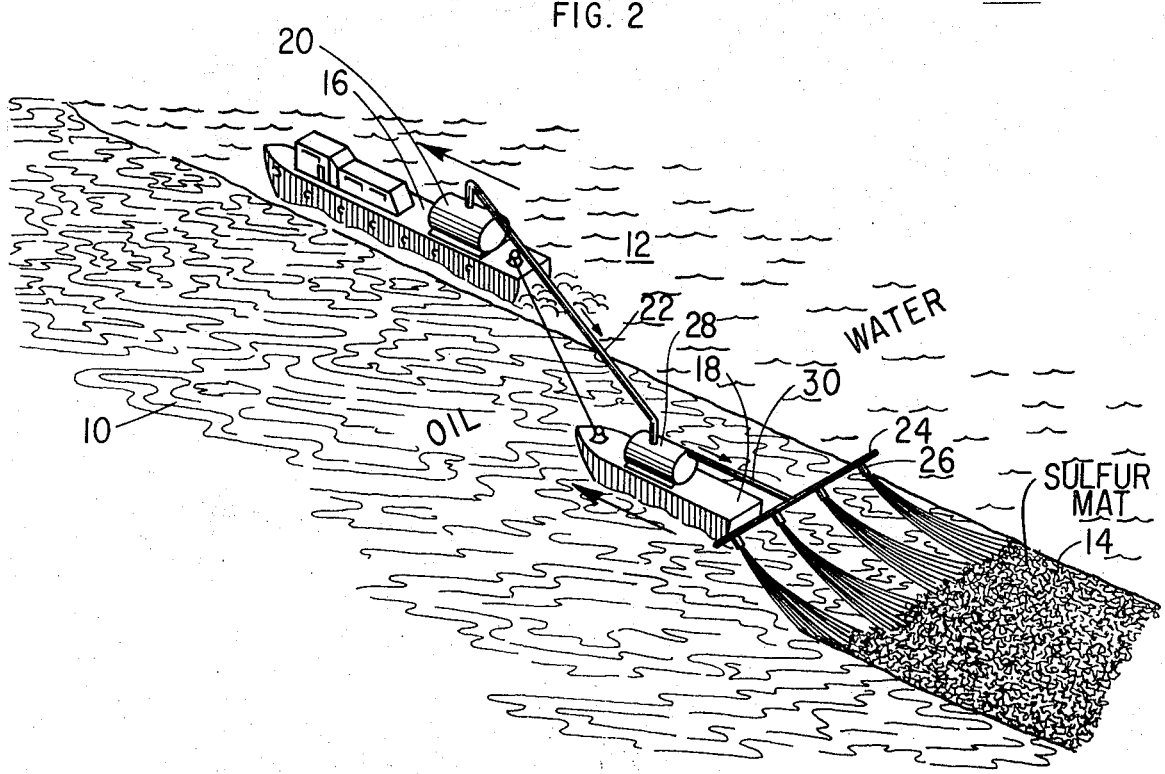
FIG. 3 shows one system for forming a sulfur mat.

Attention is first directed to FIGS. 1, 2 and 3. FIG. 1 illustrates an oil spill 10 upon a body of water 12. Depending upon the quantity of oil spilled, this oil can cover a small area up to several acres and if not confined even up to square miles. In FIG. 1, the oil spill is confined by a floating barrier or fence 14 which is a sulfur mat. FIG. 3 illustrates a method of forming this sulfur barrier 14. Shown in FIG. 3 is a boat or barge 16 which is supported at the surface of the body of water 12. Boat 16 tows a sulfur-spreading boat 18 along the edge of the oil spill 10. Hot molten sulfur is provided from container means 20 on motor ship 16 through line 22 to a spraying device on the trailing boat 18. This includes a lateral line 24 which has a plurality of nozzles 26. Boat 18 has a booster pump and heater means 28 which is connected to supply line 22. The outlet of booster 28 is connected through a line 30 to lateral line 24. Lines 30 and 24 should generally be insulated to reduce heat loss. Additional heat can be supplied to line 24 and nozzles 26 by means of steam jackets, for example. The hot sulfur is supplied at a temperature which will assure that it is in its molten and somewhat viscous state when discharged through nozzles 26. This temperature is preferably in the range from about 310°F to 340°F. The molten sulfur may be pumped at a lower temperature of 250°F to 280°F to nozzles 26 where additional heat is applied to raise the temperature to above 320°F. By this means the sulfur viscosity will remain low until it is discharged through nozzles 26. The discharge temperature should be preferably about 320°F to insure that the molten sulfur will be converted to the rubbery plastic state when quenched by the water. Outlet nozzles 26 have a plurality of small openings. Typically, each opening should be about 0.05 inches in diameter. This hot sulfur is quickly cooled upon contact with the water and forms long plastic sulfur strands. These strands stretch and become interwoven by the wave and wind action as they are being applied and form a mat sufficiently strong and cohesive to confine the oil. In fact, this plastic sulfur mat 14 is sufficiently strong so that it can be towed or pushed to some extent. The bulk density of the mat made up of interwoven sulfur strands and occluded oil is less than the density of water. In fact, the interwoven strands of sulfur without oil will float.

The width of the sulfur mat 14 should be greater than the wave length $\lambda$ as shown in FIG. 2. The vertical thickness of the sulfur mat should be sufficient to give the barrier strength and to extend from the bottom to the top of the spill thickness. Typically, this thickness should be from about 0.1 to 1.0 feet. The surface of sulfur is highly efficient as an oil collector. The surface of yellow sulfur is many times, at least three, more efficient in this respect than other forms of sulfur such as white sulfur, for example. Yellow sulfur is also many times, at least three, more efficient than other substances such as carbon and straw. The sulfur mat floats with the oil and allows wave energy to dissipate under it. Therefore, the strength requirements are not as great as some other fence or horizontal containment devices.

Figure 4:
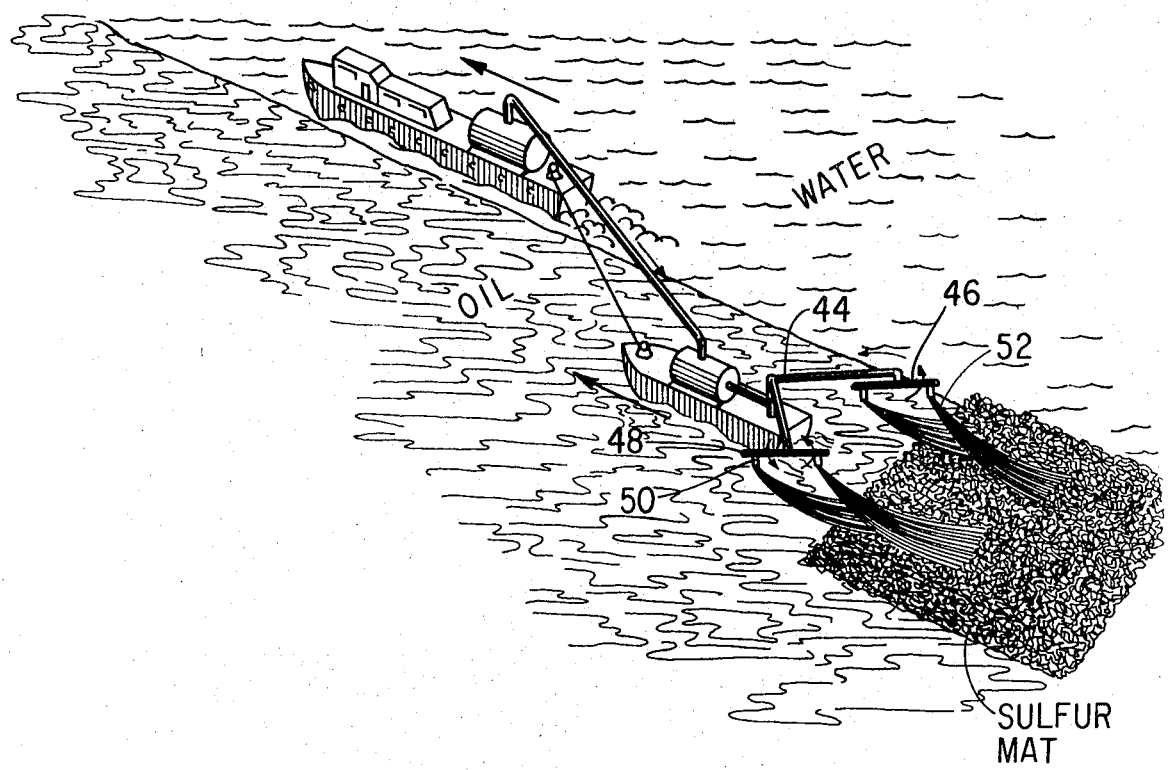
FIG. 4 shows a slightly different system for forming a sulfur mat.
Figure 8:
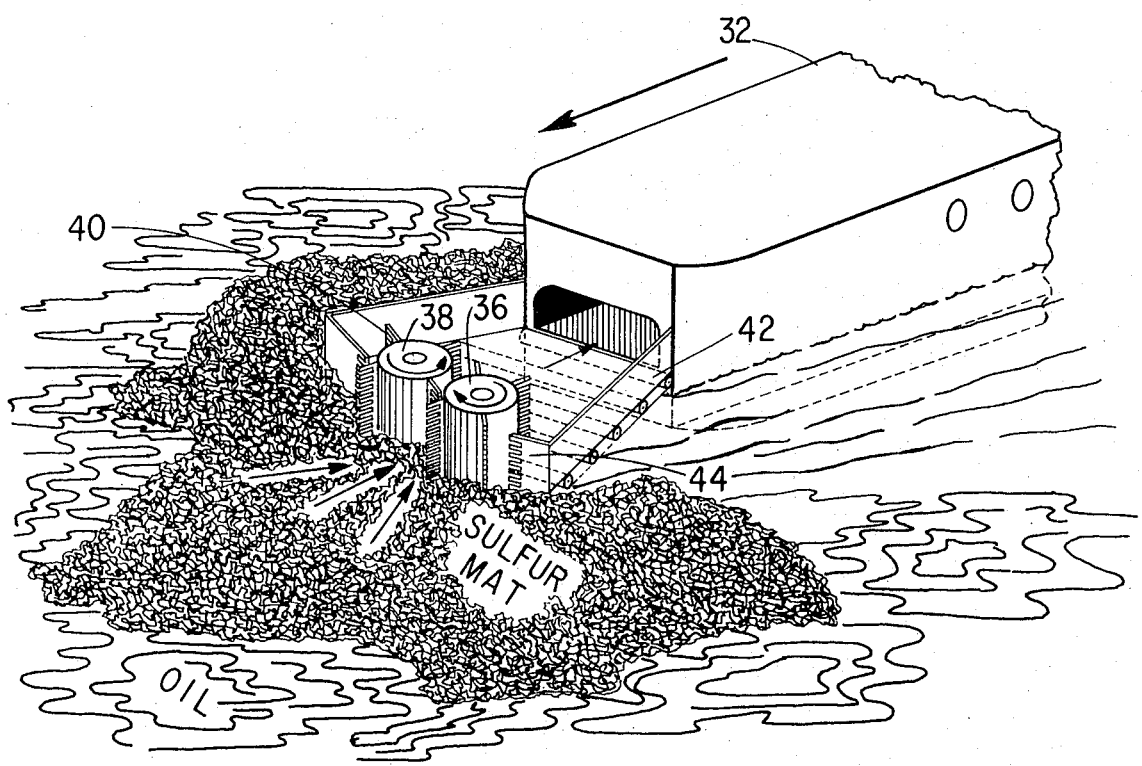
FIG. 8 illustrates one method of recovering the oil enmeshed sulfur mat.

Thus, it is seen that FIG. 1 shows an effective way of confining an oil spill within a given area. Confining an oil spill is by itself a very important step and quite beneficial. It is well known that if the oil spill is confined that the clean-up operations of any kind are greatly simplified. However, I propose an improved method of recovering the oil thus confined. I can spray the entire oil spill 10 with finely divided sulfur or I can coat the entire oil spill 10 with a sulfur mat similar to 14. The thickness of the sulfur mat inside the barrier 14 would not have to be so thick as the barrier itself. The thickness would only have to be sufficient to attract the oil and ordinarily would be only about the thickness of the contained oil spill or even less. My experiments indicate that as little as one part of a sulfur web to fifty parts of oil by weight will reduce spreading of the oil and make it easier to skim the oil from the water surface. I can recover the oil-sulfur mat with a system as illustrated in FIG. 8. Shown there is a vessel 32 provided with scoop 34. The scoop 34 is provided with a first and a second vertical cylinder 36 and 38. Each of these cylinders have horizontal radially extending fingers 40. These fingers grab the plastic sulfur mat and pull it into a belt 42 which carries the oil-sulfur mat into a container on ship 32 where it can be processed. The boat is provided with vertical fork means 44 so that fingers 40 will be cleaned of any sulfur mat on each rotation. FIG. 4 shows an embodiment slightly different from that of FIG. 3 for placement of the sulfur mat. The difference is that FIG. 4 has revolving nozzles for spraying the molten sulfur. The lateral extensions 44 have a rotating distribution conduit 46 which has a nozzle 48 and 50 at each end thereof. Conduit 46 is continually revolving as strands of molter sulfur 52 are excreted out nozzles 48 and 50. This causes a considerable amount of intertwining of the individual strands and tends to make the mat more durable.

Figure 5:
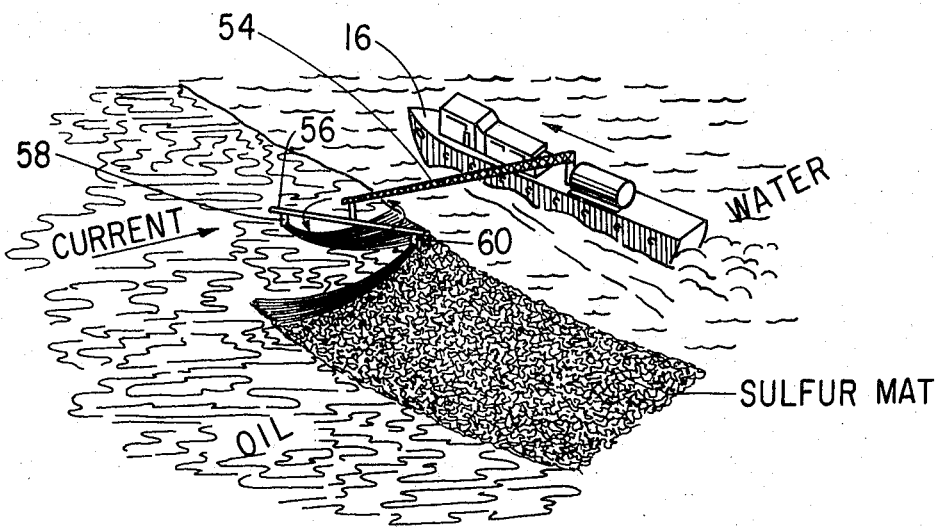
FIG. 5 illustrates another system for placing a sulfur mat on an oil spill.

FIG. 5 is another embodiment for forming a sulfur mat. In this drawing ship 16 is provided with a horizontal boom 54 which supports a revolving distribution conduit 56 at its outer end. Distribution conduit 56 has nozzles 58 and 60 at its ends. In this method ship 16 goes along the edge of the oil spill and boom 54 extends out over the oil. As the ship proceeds, molten sulfur is sprayed out through nozzles 58 and 60 as distribution conduit 56 rotates. Details of means for rotating bars 56 and for transporting the molten sulfur from ship 16 to nozzles 58 and 60 have not been shown as they are in the skill of those skilled in the art.

Figure 6:
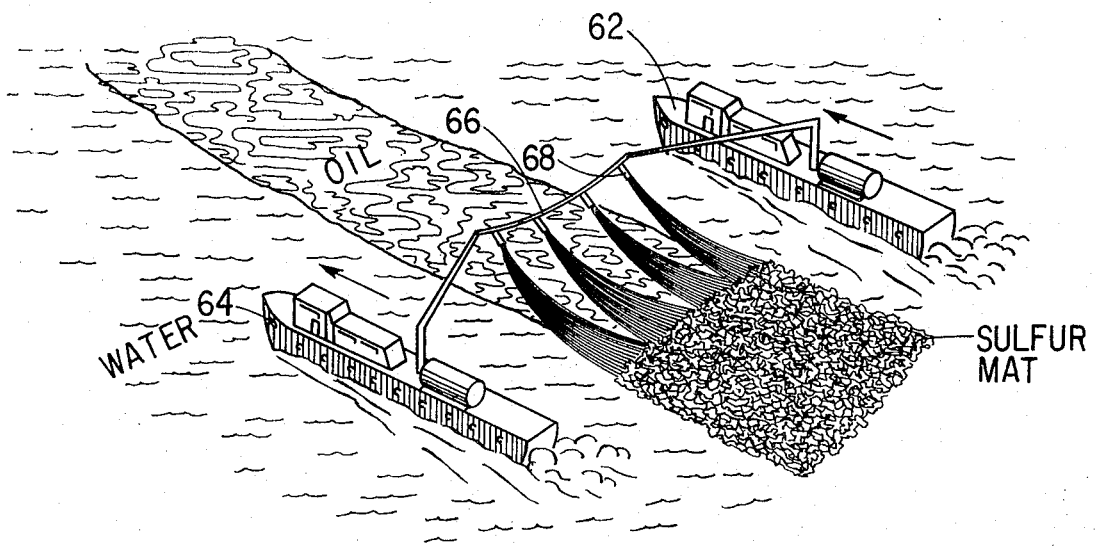
FIG. 6 illustrates still another system for placing a sulfur mat on an oil spill.

FIG. 6 illustrates another means of forming the sulfur mat. Shown there are a first ship 62 and a second ship 64. These support a distribution conduit 66 between them and over an oil spill. Conduit 66 has a plurality of nozzles 68 through which fine strands of sulfur are sprayed.

Figure 7:
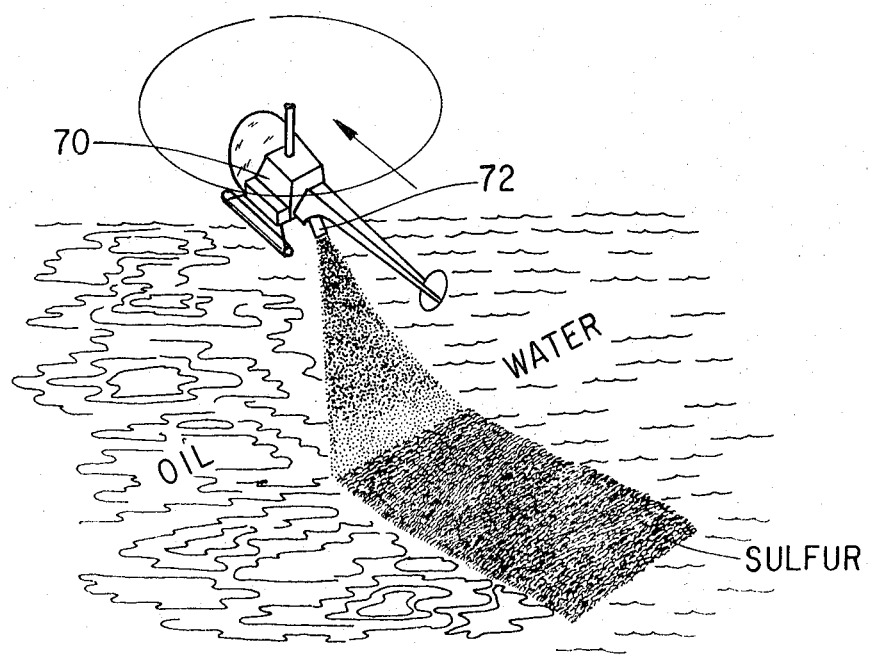
FIG. 7 illustrates a method using a helicopter for spreading sulfur on an oil spill.

Sometimes it is desired to distribute the sulfur from an aircraft. An example is shown in FIG. 7. A helicopter 70 transports a huge supply of powdered sulfur and spreads it through spraying means 72 to form a sulfur coating on the oil spill. Theoretically, the same type sulfur distribution nozzles for molten sulfur shown in FIGS. 4, 5 and 6 could be used here. However, as a practical matter the weight of the heaters, etc., would ordinarily be too much for the helicopter. Thus, it is contemplated that the helicopter will be used primarily for the distribution of powdered sulfur. Airborne equipment could however be used for quickly applying a limited amount of the plastic sulfur for confining small spills or laying down a barrier for protecting vulnerable beaches from oil encroachment.

Figure 9:
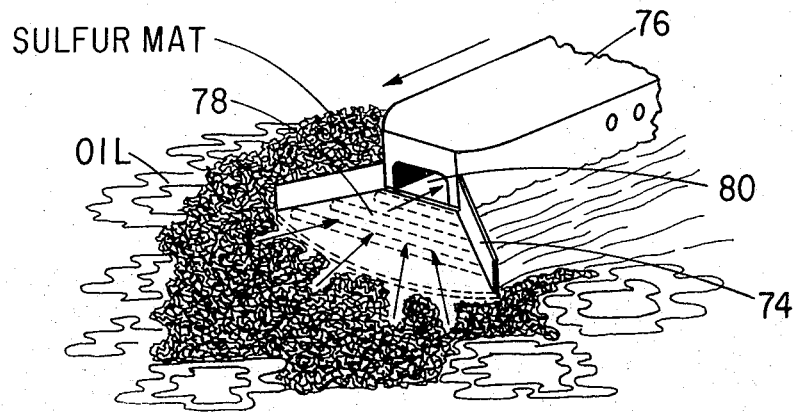
FIG. 9 shows another method for recovering sulfur oil mats.

As mentioned earlier, various means of recovering the sulfur and the oil enmeshed therein can be used. When a plastic sulfur mat is formed the oil can be recovered by skimming the oil-sulfur mat by towing the mat like a net into the recovery vessel. FIG. 9 illustrates another embodiment. There a forward scoop 74 is provided on the front end of a ship 76. This scoop has a plurality of rotary belts 78 which feed the sulfur-oil mat into a funnel 80. Once the oil and sulfur mass is brought aboard ship it can be transported ashore or separated on the ship and the sulfur reused for recovering additional oil spills. The oil can be readily separated from the sulfur. For example, in laboratory model experiments I collected masses of oily sulfur by skimming the sulfur-oil mat from water having an oil spill which had been sprayed with molten sulfur. The masses were transferred to glass vessels and heated until the sulfur remelted at about 240°F. The mixture was held at a temperature in the range of about 240°–250°F for a few minutes. The molten sulfur quickly settled to the bottom of the glass vessel as a thin liquid. In different experiments I variously drew the liquid oil off the top or the liquid sulfur off the bottom to effect separation.

So far I have discussed the use of powdered sulfur or molten sulfur for use in recovering oil from the surface of water. I can also form large plastic sulfur foam or sponges to soak up the oil spills. A sulfur foam can be formed by dissolving gas such as carbon dioxide under pressure into molten sulfur and spraying or flowing the mass through a nozzle. The sulfur foam thus formed could be thrown upon the oil to sorb the oil and then the oil soaked foam recovered. The foamed sulfur is also attractive for forming floating containment barriers and barriers for protecting beaches from oil encroachment. If desired, the foam can be formed in situ on the oil. In this manner the plastic foam would be more or less a continuous mat and can even be used as the barrier. The plastic sulfur foam enmeshes the oil in substantially the same manner as the powdered or molten sulfur as described above. The plastic sulfur foam is recovered and the oil separated from the foam by merely remelting and gravity separation.

Another means of utilizing the sulfur mat described in FIG. 1 is to push opposite sides 13A and 13B toward each other by use of barges. This will concentrate the oil spill and increase the thickness of the oil spill many times. The oil can then be recovered by direct pumping or scooping. Final clean-up operations can be obtained by sprinkling sulfur powder on the remaining oil that may escape the scoop-up or pumping operation. The floating mass of oily congealed sulfur can be scooped or seined from the water.

Figure 10:
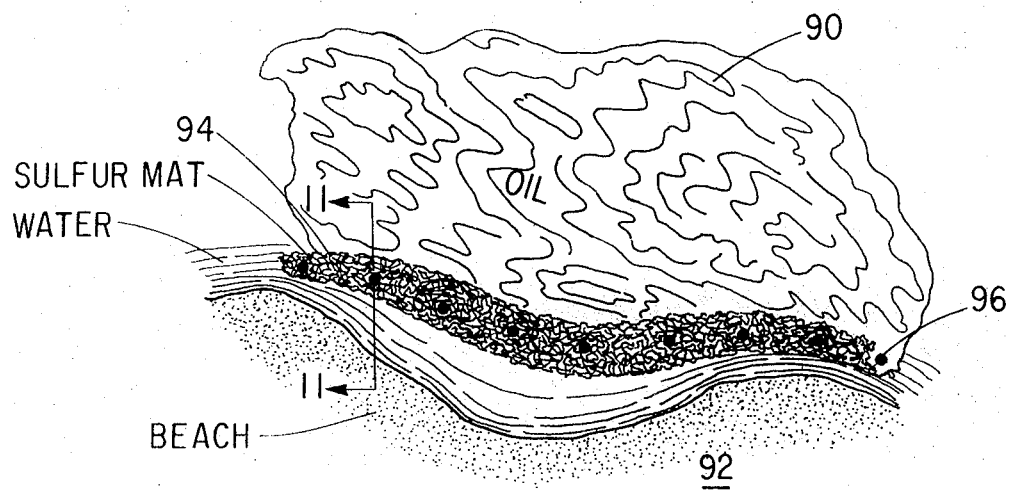
FIG. 10 shows a method of using a plastic sulfur barrier to protect a beach from oil.
Figure 11:
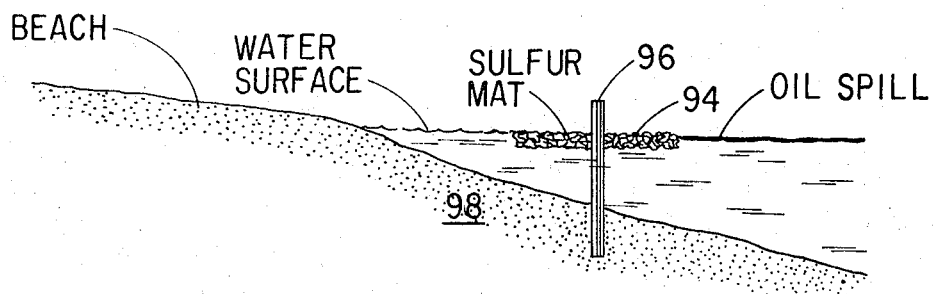
FIG. 11 is a section view taken along the line 11—11 of FIG. 10.

My invention can also be used for protecting our beaches from oil spills. Many times, tide and wind action cause the oil to be washed upon the beach. Then as the tide retreats, oil is left on the sand. I propose to protect the beach from this by a method which can best be described in FIG. 10. Shown thereon is an oil spill 90 and a beach 92. I form a plastic sulfur mat barrier 94 between the oil spill and the beach. This plastic sulfur barrier 94 can be formed in any manner as sulfur mat 14 such as described above in connection with FIGS. 3, 4, 5 and 6. Here, I propose to anchor the plastic sulfur barrier to the earth so that it will not float away. I do this by providing a series of posts 96 which as can be seen extend from above the surface of the water through mat 94 and to the bottom of the body of water 98 at a selected position on or near the beach proper. Mat 94 will rise and fall with the tide as it comes in and is wider than the expected wave length. Thus, as a wave comes in with an oil spill on top the oil is attracted by the plastic sulfur barrier 94 and only water free of oil is washed upon the beach. The protecting sulfur mat can be formed, laid down and anchored directly on the beach which will later be flooded by shallow water as the tide comes in. As the oily water encroaches, the oil will be preferentially held by the sulfur and prevented from being deposited onto the beach sand. Thus, the beach is protected from oil. After the oil spill 90 is recovered by any of the methods described above or after the oil has all been enmeshed by the plastic barrier, the plastic sulfur barrier can be removed and the oil recovered in one of the methods described above.

Various other methods of applying sulfur to protect the beach are possible. For example, a layer of crushed yellow sulfur can be deposited along the beach where the oil is expected to wash ashore. The crushed sulfur is preferably in the size range from about 0.04 to 0.2 inches in diameter. The layer should normally be in the range of from about 1 to about 12 inches deep. The sulfur should be deposited so that it would encounter the oil during high tide. When the oil is carried in by the tide or current, the crushed sulfur will preferentially sorb the oil and keep it from wetting the beach sand. Subsequently, the sulfur layer with the enmeshed oil is scooped or scraped from the beach in shallow water areas, preferably during low tide. The sulfur and enmeshed oil are then separated by heating and gravity separation. The oil is saved and the sulfur can be re-used. This separation technique offers a definite advantage over use of sorbents such as straw, which when oil-soaked is normally disposed of by burning, which causes air pollution and loss of the oil. Initial deposition and recovery of the crushed sulfur is also simple compared to some materials since the deposition and recovery of the sulfur can be accomplished with machinery. An additional advantage of the sulfur over sorbents such as straw is that the crushed sulfur has a density between that of water and of sand. (The plastic sulfur described above floats; such floating was demonstrated in my laboratory experiments and is believed due to an apparent lower density and entrained air.) The crushed sulfur particles in the specified size range will remain under the shallow water along the beaches and on top of the sand. This is the best position for intercepting the oil washing onto the beaches and allows it to be recovered easily from the top of the sand.

A slightly different application of the crushed sulfur can be made. For example, a layer of woven fabric such as canvas or sack cloth can be laid down on the beach sand first and then covered with a layer of the crushed yellow sulfur. The fabric can be held in place by stakes or posts. The outer (landward and seaward) edges of the fabric layer can be turned up to extend above the sulfur and also held in such position by stakes. After the oil is absorbed in the sulfur, the fabric and the oily sulfur particles can be lifted in toto from the sand. The beach sand is left clean and free of oil. Ordinarily, the crushed sulfur layer is positioned such that the inward or landward edge of the sulfur layer is above the high tide water level and the seaward side extends into the tide at low water.

Whiel the above invention has been described with considerable detail, it is possible to make many other modifications thereof without departing from the spirit or the scope of the invention.

I claim:

1. A method of combatting the problem of oil on a body of water which comprises depositing elemental sulfur on said oil.

2. A method as defined in claim 1 in which said sulfur is powdered and has a granular size in the range of from about 0.001 inches to about 0.01 inches.

3. A method as defined in claim 1 including the step of recovering said sulfur and oil from the body of said water.

4. A method as defined in claim 3 in which said sulfur is deposited from an airborne craft.

5. A method as defined in claim 3 in which said sulfur is deposited from a vessel supported by said body of water.

6. A method as defined in claim 3 in which the weight of sulfur deposited per unit area is less than about three times the weight of the oil in said unit area.

7. A method as defined in claim 1 in which the amount by weight of sulfur deposited over a unit area is at least about three times the weight of the oil in such unit area so that the oil and sulfur will sink.

8. A method as defined in claim 7 including the step of recovering the sulfur and oil mass from the bottom of said body of water.

9. A method of combatting the problem of oil on a body of water comprising the step of spraying fine strands of molten elemental sulfur adjacent to the oil on the surface to said body of water to enmesh the oil in a web.

10. A method as defined in claim 9 in which said sulfur is sprayed on and about the periphery of the oil to make a peripheral plastic sulfur fence.

11. A method as defined in claim 10 in which the body of water has waves and in which the peripheral fence has a width of at least the wave length of the longest expected wave.

12. A method as defined in claim 9 wherein oil enmeshed by the web of sulfur strands is skimmed from the surface of the water by towing the web in one direction.

13. A method as defined in claim 10 in which the thickness of the peripheral plastic sulfur fence is at least as thick as the layer of oil and also including the step of spraying an inner mat of plastic elemental sulfur strands in the oil surrounded by the peripheral fence, the inner mat having a thickness no greater than about the thickness of the layer of surrounded oil.

14. A method as defined in claim 11 in which finely divided powdered yellow sulfur is spread on the oil inside the peripheral sulfur fence.

15. A method as defined in claim 14 including the step of recovering the sulfur and oil adherred thereto from the surface of said body of water.

16. A method as defined in claim 15 including the step of separating the recovered oil and sulfur by heating the oil and sulfur mass and gravity separating the sulfur from the oil.

17. A method as described in claim 10 including the step of moving the mass of sulfur and oil in a desired direction.

18. A method as described in claim 10 including the step of pushing opposite sides of the fence together to concentrate the accumulation of oil.

19. A method of protecting a beach from oil which has been spilled on a body of water adjacent the beach which comprises:

spreading a mat of elemental sulfur on the surface of the body of water adjacent the beach; and anchoring the sulfur mat against horizontal movement.

20. A method as defined in claim 19 in which said anchoring includes the step of placing posts in the bottom of the body of water along the area where the sulfur mat is positioned, the top of said posts extending above the top of the highest expected wave.

21. A method of recovering oil from the surface of a body of water which includes the step of placing bodies of foamed elemental sulfur on the oil to absorb oil and recovering the oil enmeshed by the sulfur foam.

22. A method of protecting a beach from petroleum oil floating on a body of water adjacent the beach by depositing elemental sulfur directly on the beach which will later be flooded.

23. A method as defined in claim 22 in which the sulfur is a mat of foam.

24. A method as defined in claim 22 in which said sulfur is deposited in the form of intertwined sulfur fiber.

25. A method as defined in claim 22 in which said sulfur is crushed sulfur in which the particle size is in the range of 0.04 to 0.2 inches.

26. A method as defined in claim 25 in which a layer of woven fabric is first laid down on the beach and the crushed sulfur is subsequently spread on the woven fabric to form a sulfur layer.

27. A method as defined in claim 26 in which the edges of the fabric are turned up to a level at least to the top of the sulfur layer and held in position.

28. A method as defined in claim 27 in which the fabric layer and sulfur are recovered in toto after the sulfur has enmeshed the oil, thus leaving the beach clean.

29. A process for treating an oil slick on fresh or salt water comprising contacting at least a portion of said oil slick with a solid material consisting of elemental sulfur, causing said portion of said oil slick to coagulate.

* * * * *